May 1, 1962     J. P. FRANCIS     3,032,045
WINDSHIELD WEATHER PROTECTOR
Filed Jan. 24, 1961

INVENTOR
John P. Francis

United States Patent Office 3,032,045
Patented May 1, 1962

3,032,045
WINDSHIELD WEATHER PROTECTOR
John P. Francis, 20 Boston St., Haverhill, Mass.
Filed Jan. 24, 1961, Ser. No. 84,727
2 Claims. (Cl. 135—5)

This invention relates generally to automobile windshield weather protectors and more particularly to a weather protector which is supported from a horizontal supporting arm extending outwardly from a vertical supporting post, and adapted for use during inclement weather in a drive-in parking area, such as a drive-in theatre, an object thereof being to provide a very simple, sturdy, useful, and a very economical weather protector adapted for use in providing complete weather protection of the windshield area of an automobile.

Another object of this invention is to provide a windshield weather protector having a flexible awning panel rigidly supported longitudinally, and laterally flexible, to engage the lateral contour of the roof top of an automobile in rain sealing engagement therewith.

A further object of this invention is to provide a flexible fabric awning panel which is vertically and freely suspended from the horizontal supporting arm, and adapted to be angularly adjustable from said arm to adjustably engage the roof top of an automobile for support thereto.

A still further object of this invention is to provide an awning structure which is very easily assembled, easily and safely moved from an "in use" to an "out of use" position, and easily attached to and detached from the roof top of an automobile, while viewing outdoor movies or the like during inclement weather conditions.

With these objects and still further objects in view, as will hereinafter more fully appear, the invention comprises certain novel constructions, combination and arrangement of parts, and novel functional features, hereinafter described and claimed, and illustrated in the accompanying drawings, in which:

Figure 1:
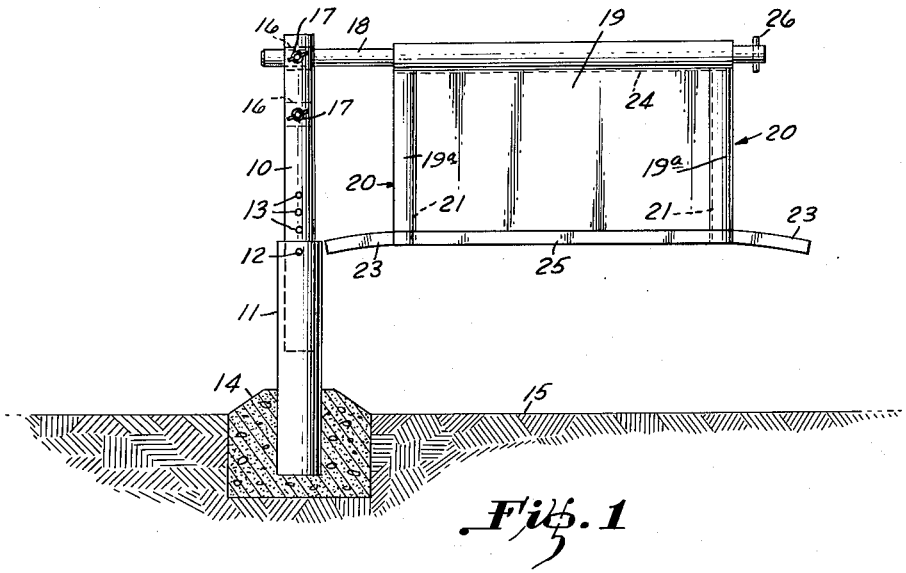
FIGURE 1 is a front elevation view of the device showing the awning panel freely suspended prior to engagement with the roof top of an automobile, as shown in FIGURE 2.

Referring now in detail to the drawings, in FIGURE 1 a vertical inner supporting post 10 is shown supported by an outer vertical supporting post 11, said outer post 11 being supported by concrete anchoring means 14 secured in the ground 15.

The vertical inner supporting post 10, FIGURE 1, is provided with a series of cross bores 13, at the lower portion thereof, to adjustably engage the removable supporting pin 12 mounted on outer post 11. Vertical adjustment of the inner post 10, within outer post 11, is thereby accomplished.

Inner supporting post 10 is provided with cross bores 16, at the upper portion thereof, to adjustably support an adjustable horizontal supporting arm 18 at the desired height and secured in position by the wing nut 17 mounted on the inner post 10.

A vertical supporting post with a horizontal supporting arm extending therefrom, and a flexible fabric awning adapted to be supported and secured in fluid sealing engagement with the lateral contour of the roof top of an automobile, is shown and described in my copending application, Serial No. 853,507, filed November 17, 1959. My invention therefore, is primarily concerned with the longitudinal supporting members for freely supporting the awning panel on the roof top, in rain sealing and friction supporting engagement with the said roof top.

Figure 2:
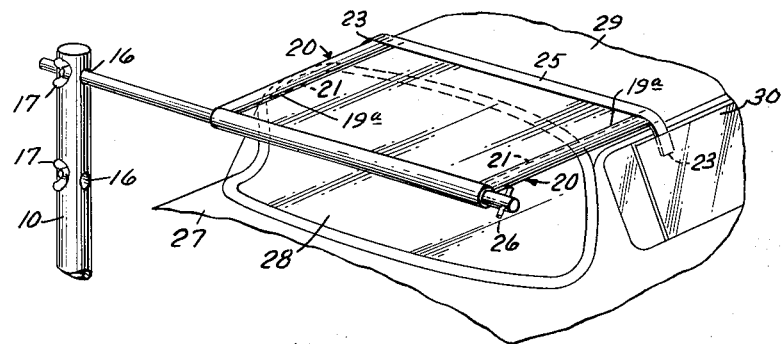
FIGURE 2 is a side elevation fragmentary view of the automobile, showing the awning panel supported in friction supporting and rain sealing engagement with the lateral contour of the roof top.

Freely attached to the horizontal supporting arm 18, FIGURES 1 and 2, is a flexible weather protector or fabric awning panel 19, in the form of a draw curtain, supported by the sleeve portion thereof formed by the stitches 24 or other suitable means. The awning 19 is laterally movable on the horizontal supporting arm 18, and limited in said movement by the stop pin 26 on arm 18.

The awning panel 19 is provided with a reinforcing band 25 at the lower portion thereof to provide lateral reinforcement thereto. The optional members, tab end members 23 or other suitable securing means, attached to the reinforcing band 25, are used solely when the awning panel 19 is installed on the roof top 29 of an automobile 27 during extremely heavy or gusty winds. The awning panel 19 is then secured in position, thereby eliminating any possible damage to the automobile due to the severity of the wind.

Figure 3:
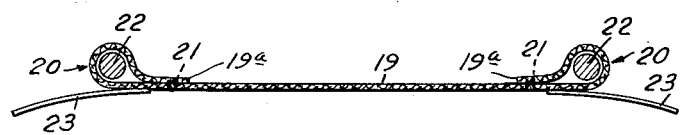
FIGURE 3 is a cross sectional view of the awning panel showing the longitudinal supporting members mounted within the outer end portions of said awning panel.

The water repellent panel 19, made of fabric or other suitable flexible material, is provided with outer longitudinal sleeves or pockets generally designated by the numeral 20, FIGURES 1, 2 and 3. The sleeves 20 are formed in the longitudinal outer end portions of the awning 19, the stitches 21 or other suitable means engaging the end portions 19a of the awning 19. Encased within each sleeve 20 is a longitudinal supporting member 22, FIGURE 3, preferably a light rod or tube made of waterproof cardboard, plastic, hard rubber, or the like, which may be filled with sand or other suitable material for the desired weight and intended use of the device during inclement weather conditions.

In the use of the device, due to weather conditions, the flexible awning 19 is moved laterally and outwardly on the horizontal supporting arm 18 to a fully extended and supported position, as shown in FIGURE 2. The awning 19 is grasped by the outer side 20 and preferably extended laterally over the windshield 28 and over the roof top 29 of the automobile. The longitudinal supporting members 22 of awning 19 are adapted to freely engage the extreme outer portions of the roof top to provide a longitudinally rigid awning support between the horizontal supporting arm 18 and the roof top 29. Lateral flexibility of the awning 19 is maintained and lateral tautness is provided by the weight of the longitudinal members 22, which extend at the outer edges of the roof top.

Referring back to FIGURE 2, it may be noted that the awning panel 19, since it is supported longitudinally by the outer longitudinal rigid members 22, the said awning is rigidly and freely supported onto the roof top 29 of the automobile. The awning 19 is therefore supported without any additional element, element 23 or any other suitable securing means being optional for attachment and use thereof, and used solely, if, and when the awning 19 is erected with exceedingly strong or gusty winds in force, in which event, tab members 23 may be secured in position by the side windows 30 of the side doors of the automobile. It is also quite obvious that the awning panel 19 may be of such a lateral width, as to hang down over both sides of an automobile, to provide additional and stronger rain and wind protection.

In FIGURE 1, removable supporting pin 12 is shown engaging both the outer post 11 and the inner post 10. It is quite evident that removable pin 12 may be inserted solely through a cross bore 13, of inner post 10, to frictionally engage the top surface of outer post 11. This provides adjustable support and also axial movement of inner post 10, whereby movement of the awning 19, from a lateral "in use" position, to a ninety degree "out of use" position, either way, is provided for the awning structure.

The extreme simplicity of the structural and functional features of the device; the ease required to move the device for "use" and "out of use"; the exceedingly small initial cost and upkeep, and; with the safety, pleasure and complete comfort provided for both management and the patrons, it is therefore, that clear and complete windshield vision is provided in a drive-in theatre during inclement weather.

Having thus described my invention, I desire to add that changes may be made in the construction and the arrangement of the device, without departing from the spirit and the scope of the invention, as disclosed in the appended claims.

I claim:

1. An automobile windshield weather protector adapted for erection and use in a drive-in parking area such as a drive-in theatre comprising, a vertical supporting post, a horizontally mounted supporting arm extending from the said vertical supporting post, a laterally adjustable and laterally retractable flexible water repellent awning curtain freely supported and vertically suspended from the said laterally positioned horizontal supporting arm in the form of a draw curtain, said freely suspended awning curtain adapted to be adjustably extended from a fully retracted vertical position to a laterally extended horizontal position over the roof top of a rearwardly spaced apart parked automobile for adjustable longitudinal and lateral friction supporting and rain sealing engagement thereto, said awning curtain being provided with outer longitudinal pockets for supporting a longitudinal supporting member in each of the said pockets, and opposing longitudinally and laterally adjustable longitudinal supporting members independently and freely supported of each other and mounted within each of the said outer longitudinal pockets in providing said longitudinally and laterally adjustable supporting engagement and the disengagement of said retractable awning curtain, each of the said independently movable longitudinal supporting members adapted to freely engage the longitudinal extreme outer lateral and downward portions of the roof top in an adjustable freely movable outward and downward position in providing said supporting engagement of said retractable awning curtain, the lateral tautness of said awning curtain occuring upon the said outward lateral movement of each of the said longitudinal supporting members.

2. An automobile windshield weather protector as defined in claim 1, and further including flexible outer end tab securing members extending outwardly of each of the corner portions of the lateral free end of said awning curtain and adapted to be adjustably and frictionally engaged to the automobile body portion for instant self-release either from within or upon sufficient movement of the automobile, said tab members being provided as additional means to adjustably compress the said lateral free end portion of the said awning curtain downwardly and to adjustably secure the said awning in a laterally taut form with said roof top upon pulling each of the said tab members downwardly and then inwardly within the automobile, said laterally opposed tab members being frictionally engaged and releasably disengaged between the movable windows on the doors of the automobile body portion, said disengagement of said tab securing members adapted to occur either upon said movement of the windows or upon movement of the parked automobile in providing sliding disengagement therefrom.

References Cited in the file of this patent

UNITED STATES PATENTS

| | | |
|---|---|---|
| 2,315,680 | Ward | Apr. 6, 1943 |
| 2,853,129 | Leavitt et al. | Sept. 23, 1958 |
| 2,926,678 | Francis | Mar. 1, 1960 |
| 2,956,573 | Brown | Oct. 18, 1960 |